United States Patent
Wang et al.

(10) Patent No.: US 10,254,622 B2
(45) Date of Patent: Apr. 9, 2019

(54) POLYMER ADDITIVES USED IN COLOR ELECTROPHORETIC DISPLAY MEDIUM

(71) Applicant: E INK CALIFORNIA, LLC, Fremont, CA (US)

(72) Inventors: Ming Wang, Fremont, CA (US); Hui Du, Milpitas, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 15/893,747

(22) Filed: Feb. 12, 2018

(65) Prior Publication Data

US 2018/0231864 A1    Aug. 16, 2018

Related U.S. Application Data

(60) Provisional application No. 62/459,174, filed on Feb. 15, 2017.

(51) Int. Cl.
*G02F 1/167* (2006.01)
*G02F 1/1675* (2019.01)

(52) U.S. Cl.
CPC ...... *G02F 1/167* (2013.01); *G02F 2001/1672* (2013.01); *G02F 2001/1678* (2013.01)

(58) Field of Classification Search
USPC .......................... 359/296; 345/107; 252/586
See application file for complete search history.

(56) References Cited

U.S. PATENT DOCUMENTS

| | | | |
|---|---|---|---|
| 2,800,457 A | 7/1957 | Green et al. | |
| 4,001,140 A | 1/1977 | Foris | |
| 4,273,672 A | 6/1981 | Vassiliades | |
| 5,961,804 A | 10/1999 | Jacobson | |
| 6,017,584 A | 1/2000 | Albert | |
| 6,120,588 A | 9/2000 | Jacobson | |
| 6,120,839 A | 9/2000 | Comiskey | |
| 6,241,921 B1 | 6/2001 | Jacobson | |
| 6,262,706 B1 | 7/2001 | Albert | |
| 6,262,833 B1 | 7/2001 | Loxley | |
| 6,300,932 B1 | 10/2001 | Albert | |
| 6,323,989 B1 | 11/2001 | Jacobson | |
| 6,377,387 B1 | 4/2002 | Duthaler | |
| 6,515,649 B1 | 2/2003 | Albert | |
| 6,538,801 B2 | 3/2003 | Jacobson | |
| 6,580,545 B2 | 6/2003 | Morrison | |
| 6,652,075 B2 | 11/2003 | Jacobson | |
| 6,672,921 B1 | 1/2004 | Liang | |
| 6,693,620 B1 | 2/2004 | Herb | |
| 6,721,083 B2 | 4/2004 | Jacobson | |
| 6,727,881 B1 | 4/2004 | Albert | |
| 6,788,449 B2 | 9/2004 | Liang | |
| 6,822,782 B2 | 11/2004 | Honeyman | |
| 6,831,771 B2 | 12/2004 | Ho | |
| 6,866,760 B2 | 3/2005 | Paolini, Jr. | |
| 6,870,661 B2 | 3/2005 | Pullen | |
| 6,914,713 B2 | 7/2005 | Chung | |
| 6,927,892 B2 | 8/2005 | Ho | |
| 6,930,818 B1 | 8/2005 | Liang | |
| 6,956,690 B2 | 10/2005 | Yu | |
| 6,958,849 B2 | 10/2005 | Chen | |
| 6,982,178 B2 | 1/2006 | LeCain et al. | |
| 7,002,728 B2 | 2/2006 | Pullen | |
| 7,012,600 B2 | 3/2006 | Zehner | |
| 7,038,655 B2 | 5/2006 | Herb | |
| 7,052,766 B2 | 5/2006 | Zang | |
| 7,072,095 B2 | 7/2006 | Liang | |
| 7,075,502 B1 | 7/2006 | Drzaic | |
| 7,110,162 B2 | 9/2006 | Wu | |
| 7,113,323 B2 | 9/2006 | Ho | |
| 7,116,318 B2 | 10/2006 | Amundson | |
| 7,141,688 B2 | 11/2006 | Feng | |
| 7,142,351 B2 | 11/2006 | Chung | |
| 7,144,942 B2 | 12/2006 | Zang | |
| 7,170,670 B2 * | 1/2007 | Webber .............. | G02F 1/167 359/296 |
| 7,180,649 B2 | 2/2007 | Morrison | |
| 7,226,550 B2 | 6/2007 | Hou | |
| 7,230,750 B2 | 6/2007 | Whitesides | |
| 7,230,751 B2 | 6/2007 | Whitesides | |
| 7,236,290 B1 | 6/2007 | Zhang | |
| 7,247,379 B2 | 7/2007 | Pullen | |
| 7,277,218 B2 | 10/2007 | Hwang | |
| 7,286,279 B2 | 10/2007 | Yu | |
| 7,312,784 B2 | 12/2007 | Baucom | |
| 7,312,916 B2 | 12/2007 | Pullen | |
| 7,339,715 B2 | 3/2008 | Webber | |
| 7,375,875 B2 | 5/2008 | Whitesides | |
| 7,382,514 B2 | 6/2008 | Hsu | |
| 7,390,901 B2 | 6/2008 | Yang | |
| 7,411,720 B2 | 8/2008 | Honeyman et al. | |
| 7,453,445 B2 | 11/2008 | Amundson | |
| 7,473,782 B2 | 1/2009 | Yang | |
| 7,532,388 B2 | 5/2009 | Whitesides et al. | |
| 7,532,389 B2 | 5/2009 | Li | |
| 7,535,624 B2 | 5/2009 | Amundson et al. | |
| 7,572,394 B2 | 8/2009 | Gu | |
| 7,576,904 B2 | 8/2009 | Chung | |
| 7,580,180 B2 | 8/2009 | Ho | |
| 7,679,814 B2 | 3/2010 | Paolini, Jr. | |
| 7,715,088 B2 | 5/2010 | Liang | |
| 7,746,544 B2 | 6/2010 | Comiskey | |
| 7,767,112 B2 | 8/2010 | Hou | |
| 7,839,564 B2 | 11/2010 | Whitesides et al. | |

(Continued)

OTHER PUBLICATIONS

Korean Intellectual Property Office; PCT/US2018/017742; International Search Report and Written Opinion; dated Jun. 1, 2018.

(Continued)

*Primary Examiner* — Monique R Peets
(74) *Attorney, Agent, or Firm* — Antranig Baronian

(57) ABSTRACT

An electrophoretic medium may be incorporated into an electrophoretic display that includes a dispersion containing a non-polar fluid, a plurality of first charged colored particles, polyisobutylene, and an additive selected from co-polymers of vinyl aromatics and at least one hydrocarbon having 2 to 5 carbons and at least one double bond. The co-polymer and the ratio of the co-polymer to polyisobutylene is selected, such that bistability performance is maintained while improving the color state performance of the display.

18 Claims, 1 Drawing Sheet

(56) References Cited

U.S. PATENT DOCUMENTS

| | | | |
|---|---|---|---|
| 7,848,006 B2 | 12/2010 | Wilcox | |
| 7,903,319 B2 * | 3/2011 | Honeyman | G02F 1/167 |
| | | | 349/33 |
| 7,951,938 B2 | 5/2011 | Yang | |
| 8,009,348 B2 | 8/2011 | Zehner | |
| 8,018,640 B2 | 9/2011 | Whitesides | |
| 8,115,729 B2 | 2/2012 | Danner | |
| 8,119,802 B2 | 2/2012 | Moonen et al. | |
| 8,199,395 B2 | 6/2012 | Whitesides | |
| 8,257,614 B2 | 9/2012 | Gu | |
| 8,270,064 B2 | 9/2012 | Feick | |
| 8,305,341 B2 | 11/2012 | Arango | |
| 8,361,620 B2 | 1/2013 | Zang | |
| 8,363,306 B2 | 1/2013 | Du | |
| 8,390,918 B2 | 3/2013 | Wilcox | |
| 8,582,196 B2 | 11/2013 | Walls | |
| 8,593,718 B2 | 11/2013 | Comiskey | |
| 8,654,436 B1 | 2/2014 | Feick | |
| 8,902,491 B2 | 12/2014 | Wang | |
| 8,961,831 B2 | 2/2015 | Du | |
| 9,052,564 B2 | 6/2015 | Sprague | |
| 9,114,663 B2 | 8/2015 | Ho | |
| 9,158,174 B2 | 10/2015 | Walls | |
| 9,170,468 B2 | 10/2015 | Lin | |
| 9,279,906 B2 | 3/2016 | Kang | |
| 9,341,915 B2 | 5/2016 | Yang | |
| 9,348,193 B2 | 5/2016 | Hiji | |
| 9,361,836 B1 | 6/2016 | Telfer | |
| 9,366,935 B2 | 6/2016 | Du | |
| 9,372,380 B2 | 6/2016 | Du | |
| 9,382,427 B2 | 7/2016 | Du | |
| 9,423,666 B2 | 8/2016 | Wang | |
| 9,428,649 B2 | 8/2016 | Li | |
| 9,557,623 B2 | 1/2017 | Wang | |
| 9,588,357 B2 | 3/2017 | Blackman | |
| 9,664,978 B2 | 5/2017 | Arango | |
| 9,670,367 B2 | 6/2017 | Li | |
| 9,688,859 B2 | 8/2017 | Yezek | |
| 9,726,957 B2 | 8/2017 | Telfer | |
| 9,778,537 B2 | 10/2017 | Wang | |
| 2003/0002132 A1 * | 1/2003 | Foucher | C09D 11/50 |
| | | | 359/296 |
| 2003/0048522 A1 | 3/2003 | Liang | |
| 2003/0151029 A1 | 8/2003 | Hsu | |
| 2003/0164480 A1 | 9/2003 | Wu | |
| 2003/0169227 A1 | 9/2003 | Wu | |
| 2004/0030125 A1 | 2/2004 | Li | |
| 2005/0012980 A1 | 1/2005 | Wilcox | |
| 2005/0136347 A1 | 6/2005 | Gu | |
| 2006/0132896 A1 | 6/2006 | Hsu | |
| 2006/0281924 A1 | 12/2006 | Yang | |
| 2007/0268567 A1 | 11/2007 | Chung | |
| 2009/0009852 A1 | 1/2009 | Honeyman | |
| 2009/0206499 A1 | 8/2009 | Whitesides | |
| 2009/0225398 A1 | 9/2009 | Duthaler | |
| 2010/0148385 A1 | 6/2010 | Balko | |
| 2011/0217639 A1 | 9/2011 | Sprague | |
| 2012/0049125 A1 | 3/2012 | Du | |
| 2013/0161565 A1 | 6/2013 | Laxton | |
| 2013/0193385 A1 | 8/2013 | Li | |
| 2013/0244149 A1 | 9/2013 | Wang | |
| 2014/0011913 A1 | 1/2014 | Du | |
| 2014/0078024 A1 | 3/2014 | Paolini, Jr. | |
| 2014/0078573 A1 | 3/2014 | Comiskey | |
| 2014/0078576 A1 | 3/2014 | Sprague | |
| 2014/0078857 A1 | 3/2014 | Nelson | |
| 2014/0104674 A1 | 4/2014 | Ting | |
| 2014/0231728 A1 | 8/2014 | Du | |
| 2014/0347718 A1 | 11/2014 | Duthaler et al. | |
| 2015/0005720 A1 | 1/2015 | Zang | |
| 2015/0092262 A1 | 4/2015 | Greinert | |
| 2015/0177590 A1 | 6/2015 | Laxton | |
| 2015/0185509 A1 | 7/2015 | Wang | |
| 2015/0213765 A1 | 7/2015 | Gates | |
| 2015/0241754 A1 | 8/2015 | Du | |
| 2015/0248045 A1 | 9/2015 | Sprague | |
| 2015/0277160 A1 | 10/2015 | Laxton | |
| 2015/0301425 A1 | 10/2015 | Du | |
| 2016/0012710 A1 | 1/2016 | Lu | |
| 2016/0168360 A1 | 6/2016 | Merchak | |
| 2016/0170106 A1 | 6/2016 | Wang | |

OTHER PUBLICATIONS

Gutcho, M.H., Microcapsules and Microencapsulation Techniques, Noyes Data Corp., Park Ridge NJ, (1976).

Vandegaer, J.E. (ed.), "Microencapsulation Processes and Applications", pp. v-x, 1-180 (Plenum Press, New York 1974).

* cited by examiner

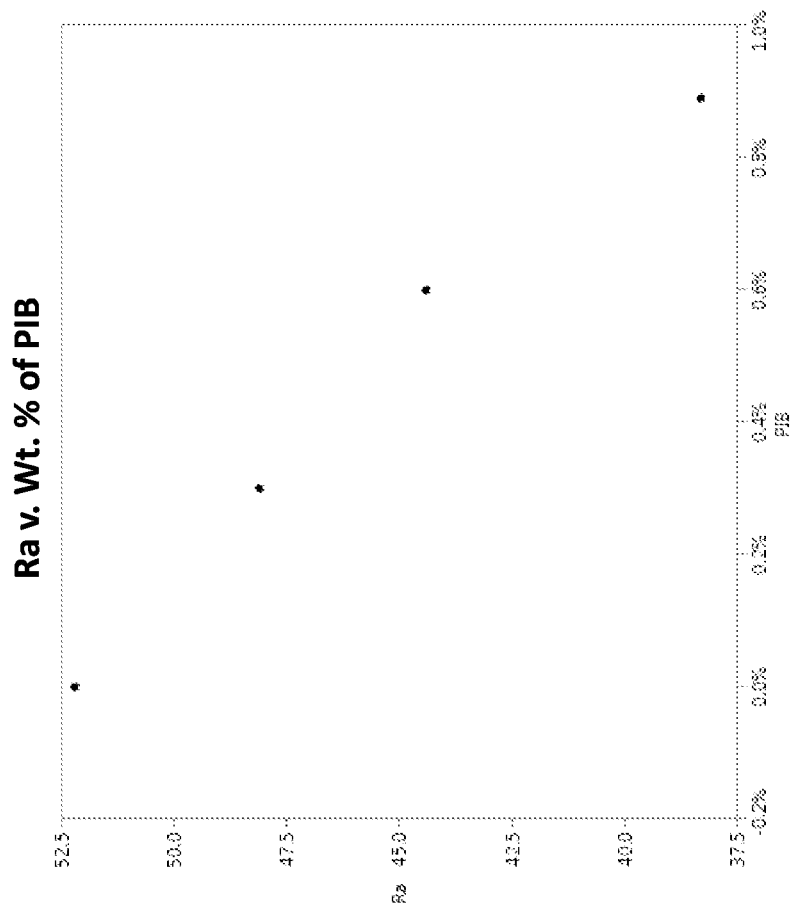

POLYMER ADDITIVES USED IN COLOR ELECTROPHORETIC DISPLAY MEDIUM

CROSS-REFERENCE TO RELATED APPLICATION

This application claims priority to and the benefit of U.S. Provisional Application having Ser. No. 62/459,174, filed on Feb. 15, 2017, the content of which is incorporated by reference herein in its entirety.

BACKGROUND OF INVENTION

This invention relates to color electrophoretic displays and polymer additives that promote bistability of electrophoretic media in the color displays without degrading color performance.

Particle-based electrophoretic displays have been the subject of intense research and development for a number of years. In such displays, a plurality of charged particles (sometimes referred to as pigment particles) move through a fluid under the influence of an electric field. The electric field is typically provided by a conductive film or a transistor, such as a field-effect transistor. Electrophoretic displays have good brightness and contrast, wide viewing angles, state bistability, and low power consumption when compared with liquid crystal displays. Such electrophoretic displays have slower switching speeds than LCD displays, however, and electrophoretic displays are typically too slow to display real-time video. Additionally, the electrophoretic displays can be sluggish at low temperatures because the viscosity of the fluid limits the movement of the electrophoretic particles. Despite these shortcomings, electrophoretic displays can be found in everyday products such as electronic books (e-readers), mobile phones and mobile phone covers, smart cards, signs, watches, shelf labels, and flash drives.

An electrophoretic image display (EPID) typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates. An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the particles to migrate to the opposite plate, thereby reversing the color. Alternatively, an electrophoretic fluid may have two types of pigment particles of contrasting colors and carrying opposite charges and the two types of pigment particles are dispersed in a clear solvent or solvent mixture. In this case, when a voltage difference is imposed between the two electrode plates, the two types of pigment particles would move to opposite ends (top or bottom) in a display cell. Thus, one of the colors of the two types of pigment particles would be seen at the viewing side of the display cell.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. In a microcell electrophoretic display, the charged pigment particles are retained within a plurality of cavities formed within a carrier medium, typically a polymeric film. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,831,771; 6,870,661; 6,927,892; 6,956,690; 6,958,849; 7,002,728; 7,038,655; 7,052,766; 7,110,162; 7,113,323; 7,141,688; 7,142,351; 7,170,670; 7,180,649; 7,226,550; 7,230,750; 7,230,751; 7,236,290; 7,247,379; 7,277,218; 7,286,279; 7,312,916; 7,375,875; 7,382,514; 7,390,901; 7,411,720; 7,473,782; 7,532,388; 7,532,389; 7,572,394; 7,576,904; 7,580,180; 7,679,814; 7,746,544; 7,767,112; 7,848,006; 7,903,319; 7,951,938; 8,018,640; 8,115,729; 8,119,802; 8,199,395; 8,257,614; 8,270,064; 8,305,341; 8,361,620; 8,363,306; 8,390,918; 8,582,196; 8,593,718; 8,654,436; 8,902,491; 8,961,831; 9,052,564; 9,114,663; 9,158,174; 9,341,915; 9,348,193; 9,361,836; 9,366,935; 9,372,380; 9,382,427; and 9,423,666; and U.S. Patent Applications Publication Nos. 2003/0048522; 2003/0151029; 2003/0164480; 2003/0169227; 2003/0197916; 2004/0030125; 2005/0012980; 2005/0136347; 2006/0132896; 2006/0281924; 2007/0268567; 2009/0009852; 2009/0206499; 2009/0225398; 2010/0148385; 2011/0217639; 2012/0049125; 2012/0112131; 2013/0161565; 2013/0193385; 2013/0244149; 2014/0011913; 2014/0078024; 2014/0078573; 2014/0078576; 2014/0078857; 2014/0104674; 2014/0231728; 2014/0339481; 2014/0347718; 2015/0015932; 2015/0177589; 2015/0177590; 2015/0185509; 2015/0218384; 2015/0241754; 2015/0248045; 2015/0301425; 2015/0378236; 2016/0139483; and 2016/0170106;

(b) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

Many commercial electrophoretic media essentially display only two colors, with a gradient between the black and white extremes, known as "grayscale." Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid. In the latter case, the first color is displayed when the first type of particles lie adjacent the viewing surface of the display and the second color is displayed when the second type of particles lie adjacent the viewing surface). Typically the two colors are black and white.

If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending').

Although seemingly simple, electrophoretic media and electrophoretic devices display complex behaviors. For instance, it has been discovered that simple "on/off" voltage pulses are insufficient to achieve high-quality text in electronic readers. Rather, complicated "waveforms" are needed to drive the particles between states and to assure that the new displayed text does not retain a memory of the previous text, i.e., a "ghost." See, for example, U.S. Patent Application No. 20150213765. Compounded with the complexities of the electric fields, the internal phase, i.e., the mixture of particles (pigment) and fluid, can exhibit unexpected behavior due to interactions between charged species and the surrounding environment (such as an encapsulation medium) upon the application of an electric field. Additionally, unexpected behaviors may result from impurities in the fluid, pigments, or encapsulation medium. Accordingly, it is difficult to predict how an electrophoretic display will respond to variations in the internal phase composition.

It has been found, for example in U.S. Pat. No. 7,170,670, that the addition of certain polymers, such as polyisobutylene, to the suspending fluid used in electrophoretic displays provides an increase in image stability, i.e. bistability, greater than can be accounted for by the increase in viscosity of the fluid caused by the addition of the polymer. Accordingly, the use of these polymers in the suspending fluid allows for substantial increases in image stability without excessive increase in the switching time of the display. However, it has been found that the introduction of these polymers results in a degradation of the color state when used in colored electrophoretic media.

Thus, there is a need for improved electrophoretic media and displays having improved bistability without sacrificing color state performance

SUMMARY OF INVENTION

It is an aspect of the present invention to provide an electrophoretic medium that includes a non-polar fluid, a plurality of at least a first set of charged colored particles, polyisobutylene, and an additive selected from co-polymers of vinyl aromatics and at least one substituted or unsubstituted hydrocarbon having 2 to 5 carbons and at least one double bond. The co-polymer and the ratio of the co-polymer to polyisobutylene is selected, such that bistability performance is maintained while improving the color state performance of the display.

This illustrative embodiment is mentioned not to limit or define the disclosure, but to provide an example to aid understanding thereof. Additional embodiments are discussed in the Detailed Description, and further description is provided there. Advantages offered by one or more of the various embodiments may be further understood by examining this specification or by practicing one or more embodiments presented.

The electrophoretic medium of the invention may be encapsulated, for example in a microcell or a protein coacervate, as discussed in the Background section. In addition, electrophoretic media of the invention can be dispersed in a polymer matrix. The encapsulated or polymer-dispersed electrophoretic media may be incorporated into a front plane laminate (FPL) and/or electro-optic displays as discussed in the Background. Such materials can be used to create electrophoretic image displays (EPID), signs, or architectural materials that will change appearance upon receipt of a signal.

BRIEF DESCRIPTION OF THE FIGURE

FIG. 1 is a graph plotting the red state (Red a*) values versus the concentration of polyisobutylene using the data provided in Table 1.

DETAILED DESCRIPTION

The performance of various types of electrophoretic media can be improved by including the combination of additives described herein. For example, the combination of polyisobutylene with a copolymer according to the invention can improve the bistability of the electrophoretic media, as well as maintain or improve the color state performance when compared to the color performance of electrophoretic media lacking the copolymer.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

In one embodiment of the present invention, an electrophoretic medium comprises a dispersion. The dispersion may comprise, a non-polar fluid, a plurality of first charged particles, polyisobutylene, and an additive selected from co-polymers of vinyl aromatics and at least one substituted or unsubstituted hydrocarbon having 2 to 5 carbons and at least one double bond.

To ensure that the polyisobutylene and the copolymer are not substantially absorbed on to the electrophoretic particles, the additives and suspending non-polar fluid combination should desirably be such that the fluid is at least a theta solvent for polyisobutylene and the copolymer at room temperature. In order to extend the temperature range of the enhanced image stability, it is optimal if the fluid is at least a moderately good to good solvent for the image stability additives. One method of choosing an appropriate additive/fluid combination is to plot the intrinsic viscosity of the combination against the molecular weight of the additives; desirable combinations are those in which the slope of a best linear fit of the log of the intrinsic viscosity against the log of the molecular weight is at least 0.5, and desirably in the range of about 0.55 to about 0.8.

Typically, the suspending fluid used in electrophoretic displays is a non-polar aliphatic hydrocarbon (alone or in combination with a halogenated hydrocarbon) and with such fluids, it is preferred that the additives are hydrocarbon polymers essentially free from functional groups, such as ionizable or ionic substituents, that may cause the additive to interact with chemical sites on the electrophoretic particles, or to physically adsorb to the surfaces of the electrophoretic particles.

For electrophoretic mediums with aliphatic hydrocarbon/halogenated hydrocarbon suspending fluids, the additives are preferably a combination of a copolymer, as further described below, and polyisobutylene (poly-2-methylpropene). A variety of other types of polymers for example polysiloxanes, and in particular polydimethylsiloxane, may also optionally be used. Poly isobutylene is commercially available in molecular weight ranges appropriate for use in the present invention, inexpensive, stable at high temperatures, resistant to oxidation and does not contain easily reactive or ionizable components. As already mentioned, ionic or ionizable components are undesirable in the polymer since release of such components into the suspending fluid might cause undesirable changes in the charges on the electrophoretic particles, and thus upon their electrophoretic mobilities. The polyisobutylene desirably has a number average molecular weight in excess of 100,000, and preferably in the range of about 150,000 to about 3,000,000, and a weight average molecular weight in excess of 100,000 and preferably in the range of about 300,000 to about 3,000,000; similar molecular weight ranges may be used with other polymers. Polyisobutylenes falling within these molecular weight ranges are readily available commercially, for example from Sigma-Aldrich, Inc., P.O. Box 2060, Milwaukee Wis. 53201 under catalogue numbers 18145-5 and 18146-3. The polyisobutylene also desirably has a viscosity average molecular weight in the range of about 200,000 to 1,200,000 g/mole. As noted above, the copolymer that may be included in the additive combination for the electrophoretic media made according to the various embodiments of the present invention may be a copolymer of a vinyl aromatic and a substituted or unsubstituted hydrocarbon having 2 to 5 carbons and at least one double bond. The vinyl aromatics that may be included in the co-polymer include, but are not limited to styrene, alpha-methyl styrene, 2-methyl styrene, 3-methyl styrene, 4-methyl styrene, 44-butyl styrene, 4-cyclohexyl styrene, 4-dodecyl styrene, 2,4-diisopropyl styrene, 2,4,6-trimethyl styrene, 2-ethyl-4-benzyl styrene, 4-(phenyl butyl)styrene, 1-vinyl naphthalene, 2-vinyl naphthalene, vinyl anthracene, 4-methoxy styrene, monochlorostyrene, dichlorostyrene, divinyl benzene, indene, methyl indene, and combinations thereof. Styrene is preferred. Examples of a substituted or unsubstituted hydrocarbons having 2 to 5 carbons and at least one double bond include, but are not limited to, ethylene, propylene, isoprene, butylene, and butadiene. In one embodiment, it is preferred that the copolymer is the polymerization product of styrene, ethylene, and propylene.

The copolymer is preferably non-absorbing on the particles and may comprise a diblock copolymer having a first block soluble in the fluid and a second block not swellable by the fluid. The diblock copolymer may comprise a first polystyrene block and a second block of a polyalkene, for example polyisoprene. Such block copolymers are commercially available and include, for example aggregating diblock copolymers made from styrene and poly(ethylenepropylene), such as Kraton (Registered Trade Mark) G1701, G1702 or G1730, all available from Kraton Polymers, Inc, Belpre, Ohio).

The presence of a substantial proportion of aromatic groups may cause poor solubility or adsorption of an additive onto the electrophoretic particles when the suspending fluid is an equal part by weight mixture of an aliphatic hydrocarbon and halogenated hydrocarbon. Therefore, a ratio of vinyl aromatic monomeric units to alkene monomeric units should be selected for the copolymer additive, so that an unwanted effect on the suspending fluid is avoided. The copolymers preferably contain from about 10 to about 50 percent, more preferably 20 to about 40 percent, styrene by weight.

The amount of additive for improving bistability and color performance in any specific system varies with the degree of image stability required, the molecular weight of the additives, and the maximum switching time of the medium which can be tolerated. However, by way of general guidance, it is desirable that the combined additives (i.e. the combined weight of polyisobutylene and copolymer) be added in an amount of from about 0.1 to about 2.5 percent by weight of the suspending fluid, and preferably in an amount of about 0.5 to about 1 percent by weight. Below about 0.1 percent, depending upon the molecular weight of the polymer, the polymer produces little or no increase in image stability other than that attributable to the increase in the viscosity of the suspending fluid, while polymer concentrations above about 2.5 percent cause an increase in viscosity which may render switching times unacceptable. The weight ratio of polyisobutylene to copolymer in the dispersion may be 1:5 to 5:1, more preferably 1:3 to 3:1.

The electrophoretic medium of the invention may include one or more types of charged particles. For purposes of this invention, a particle is any component that is charged or capable of acquiring a charge (i.e., has or is capable of acquiring electrophoretic mobility), and, in some cases, this mobility may be zero or close to zero (i.e., the particles will not move). For example, the electrophoretic medium may include first, second, third, fourth, fifth or sixth, types of charged particles. The particles may vary in charge, density, hydrophobicity and/or zeta potential. Various combinations of particle groups may have opposite charge polarities relative to each other. Also, the particles may have different colors, such as magenta, red, orange, yellow, green, cyan, blue, violet, black, and white. For example in one embodiment of the present invention, an electrophoretic medium may comprise a plurality of first, second, and third charged particles dispersed in a non-polar fluid, wherein the first charged particles are magenta, red, yellow, green, cyan, or blue, the second charged particles are white and have a charge opposite of the charge of the first charged particles, and the third charged particles are black and have a charge similar to the charge of the first charged particles.

The particles used in the various embodiments of the present invention may also optionally include colorless or transparent particles. The electrophoretic medium may additionally include surfactants, such as ionic surfactants, i.e., surfactants having a quaternary amine headgroup.

There is much flexibility in the choice of particles already known to those skilled in the art of electrophoretic displays. Typical considerations for the electrophoretic particle are its optical properties, electrical properties, and surface chemistry. The pigment should also be insoluble in the suspending fluid. The particles may be surface treated so as to improve charging or interaction with a charging agent, or to improve dispersability. The particles may be, for example, inorganic particles, neat pigments, dyed (laked) pigments or pigment/polymer composites, or any other component that is charged or capable of acquiring a charge.

Examples of inorganic pigments include, but are not limited to, $TiO_2$, $ZrO_2$, ZnO, $Al_2O_3$, CI pigment black 26 or 28 or the like (e.g., manganese ferrite black spinel or copper chromite black spinel). Particles, such as titania particles may be coated with a metal oxide, such as aluminum oxide or silicon oxide, for example.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del., hereinafter abbreviated "du Pont"), Crocein Scarlet N Ex (du Pont) (27290), Fiber Black VF (du Pont) (3023S), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Black 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 um), Statex B-12 (Columbian Carbon Co.) (a furnace black of 33 µm average particle size), and chrome green.

Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (Cl Pigment Blue 24) and Persian orange (lake of Cl Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

The electrophoretic media according to the various embodiments of the present invention may be incorporated into displays, or into front plane laminates or inverted front plane laminates that are coupled to a backplane to make a display. Many of the aforementioned patents and applications recognize that dispersions containing the pigments and additives described above may be encapsulated in microcapsules, for example. Furthermore, the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media. A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

The aforementioned U.S. Pat. Nos. 6,672,921, 6,788,449, and 6,866,760 describe methods of assembling electrophoretic displays. Essentially, this patent describes a laminate comprising a light-transmissive electrically-conductive layer and a layer of a solid electro-optic medium in electrical contact with the electrically-conductive layer. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term light-transmissive is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term light-transmissive should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or indium tin oxide (ITO), or may be a conductive polymer. Poly(ethylene terephthalate) (PET) films coated with aluminum or ITO are available commercially, for example as aluminized Mylar (Mylar is a Registered Trade Mark) from E.I. du Pont de Nemours & Company, Wilmington Del., and such commercial materials may be used with good results in the front plane laminate.

Assembly of an electro-optic display may be effected by attaching the above-described laminate to a backplane with an adhesive under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

In addition to the additives of the invention, electrophoretic media may also include charge control agents (CCAs). For example, pigment particles may be functionalized or surface coated with charged or chargeable groups. The CCAs may be absorbed into the particles, they may be covalently bound to the surface of the particles, and they may exist in a charge complex, or be loosely associated via van der Waals forces. Charge control agents often charge the particles by poorly understood and uncontrolled processes, and can lead to undesirably high conductivity of the electrophoretic medium. Also, because the charge control agent is only physically adsorbed on to the particles and is not bound thereto, changes in conditions may cause partial or complete desorption of the charge control agent from the particles, with consequent undesirable changes in the electrophoretic characteristics of the particles. The desorbed charge control agent might resorb on to other surfaces within the electrophoretic medium, and such resorption has the potential for causing additional problems.

Charge control agents comprising a quaternary amine and an unsaturated polymeric tail comprising monomers of at least 10 carbon atoms in length are preferred. Quaternary amines comprise a quaternary ammonium cation $[NR_1R_2R_3R_4]^+$ bonded to an organic molecule, for example an alkyl group or an aryl group. Quaternary amine charge control agents typically include a long non-polar tail attached to the charged ammonium cation, such as the families of fatty acid quaternary amines offered by Akzo Nobel under the tradenames ARQUAD. The quaternary amine charge control agents may be purchased in a purified form, or the charge control agents may be purchased as a reaction product that has formed a quaternary amine charge control agent. For example, SOLSPERSE 17000 (Lubrizol Corporation), may be purchased as a reaction product of 12-hydroxy-octadecanoic acid homopolymer with N,N-dimethyl-1,3-propanediamine and methylbisulfate. Other useful ionic charge control agents include, but are not limited to, sodium dodecylbenzenesulfonate, metal soap, polybutene succinimide, maleic anhydride copolymers, vinylpyridine copolymers, vinylpyrrolidone copolymer, (meth)acrylic acid copolymers or N,N-dimethylaminoethyl(meth)acrylate copolymers), Alcolec LV30 (soy lecithin), Petrostep B100 (petroleum sulfonate) or B70 (barium sulfonate), OLOA 11000 (succinimide ashless dispersant), OLOA 1200 (polyisobutylene succinimides), Unithox 750 (ethoxylates), Petronate L (sodium sulfonate), Disper BYK 101, 2095, 185, 116, 9077 & 220 and ANTITERRA series.

The charge control agents may be added to the electrophoretic medium at a concentration of greater than 1 g of charge control agent for every 100 g of charged particles. For example, the charge control agent to charged particle ratio may be 1:30 (wt/wt), e.g., 1:25 (wt/wt), e.g., 1:20 (wt/wt). The charge control agents may have an average molecular weight of greater than 12,000 grams/mole, e.g., greater than 13,000 grams/mole, e.g., greater than 14,000 grams/mole, e.g., greater than 15,000 grams/mole, e.g., greater than 16,000 grams/mole, e.g., greater than 17,000 grams/mole, e.g., greater than 18,000 grams/mole, e.g., greater than 19,000 grams/mole, e.g., greater than 20,000 grams/mole, e.g., greater than 21,000 grams/mole. For example, the average molecular weight of the charge control agent may be between 14,000 grams/mole and 22,000 grams/mole, e.g., between 15,000 grams/mole and 20,000 grams/mole. In some embodiments, the charge control agents have an average molecular weight of about 19,000 grams/mole.

Additional charge control agents may be used, with or without charged groups in polymer coatings, to provide good electrophoretic mobility to the electrophoretic particles. Stabilizers may be used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. Additional pigment properties which may be relevant are the particle size distribution, the chemical composition, and the lightfastness.

In addition to solubility, as already indicated, the non-polar suspending fluid containing the particles should be chosen based on properties such as density and refractive index. A preferred suspending fluid has a low dielectric constant (about 2), high volume resistivity (about 1015 ohm-cm), low viscosity (less than 5 centistokes ("cst")), low toxicity and environmental impact, low water solubility (less than 10 parts per million ("ppm")), and a low refractive index (less than 1.2).

The choice of non-polar fluid may be based on concerns of chemical inertness, density matching to the electrophoretic particle, or chemical compatibility with both the electrophoretic particle and bounding capsule (in the case of encapsulated electrophoretic displays). The viscosity of the fluid should be low when movement of the particles is desired.

Non-polar organic solvents, such as halogenated organic solvents, saturated linear or branched hydrocarbons (e.g. C6-C18 branched alkanes or C7-C10 branched alkanes), silicone oils, and low molecular weight halogen-containing polymers are some useful non-polar fluids. The non-polar fluid may comprise a single fluid. The non-polar fluid will, however, often be a blend of more than one fluid in order to tune its chemical and physical properties. Furthermore, the non-polar fluid may contain additional surface modifiers to modify the surface energy or charge of the electrophoretic particle or bounding capsule. Reactants or solvents for the microencapsulation process (oil soluble monomers, for example) can also be contained in the suspending fluid. Additional charge control agents can also be added to the suspending fluid.

Useful organic solvents include, but are not limited to, epoxides, such as decane epoxide and dodecane epoxide; vinyl ethers, such as cyclohexyl vinyl ether and Decave (Registered Trade Mark of International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the Isopar (Registered Trade Mark) series (Exxon, Houston, Tex.), Norpar (Registered Trade Mark) (a series of normal paraffinic liquids), Shell-Sol (Registered Trade Mark) (Shell, Houston, Tex.), and Sol-Trol (Registered Trade Mark) (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), Galden (Registered Trade Mark) (a perfluorinated ether from Ausimont, Morristown, N.J.), or Krytox (Registered Trade Mark) from du Pont (Wilmington, Del.). In a preferred embodiment, the suspending fluid is a poly (chlorotrifluoroethylene) polymer. In a particularly preferred embodiment, this polymer has a degree of polymerization from about 2 to about 10. Many of the above materials are available in a range of viscosities, densities, and boiling points.

In some embodiments, the non-polar fluid will include an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

Particle dispersion stabilizers may also be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

Encapsulation of the internal phase may be accomplished in a number of different ways. Numerous suitable procedures for microencapsulation are detailed in both Microencapsulation, Processes and Applications, (I. E. Vandegaer, ed.), Plenum Press, New York, N.Y. (1974) and Gutcho, Microcapsules and Microencapsulation Techniques, Noyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes to form the capsule include, but are not limited to, gelatin, poly(vinyl alcohol), poly(vinyl acetate), and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, poly (methyl methacrylate) (PMMA), poly(ethyl methacrylate), poly(butyl methacrylate), ethyl cellulose, poly(vinylpyridine), and polyacrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, methyl methacrylate (MMA) and acrylonitrile. Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivity, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic fluid (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one in situ polymerization process, urea and formaldehyde condense in the presence of poly(acrylic acid) (see, e.g., U.S. Pat. No. 4,001,140). In other processes, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and polyisocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Additional materials may be added to encapsulated medium to improve the construction of an electrophoretic display. For example, coating aids can be used to improve the uniformity and quality of the coated or printed electrophoretic ink material. Wetting agents may be added to adjust the interfacial tension at the coating/substrate interface and to adjust the liquid/air surface tension. Wetting agents include, but are not limited to, anionic and cationic surfactants, and nonionic species, such as silicone or fluoropolymer-based materials. Dispersing agents may be used to modify the interfacial tension between the capsules and binder, providing control over flocculation and particle settling.

In other embodiments, the electrophoretic medium may be contained in microfabricated cells, i.e., microcells, such as fabricated by E Ink under the tradename MICROCUP. Once the microcells are filled with the electrophoretic medium, the microcells are sealed, an electrode (or an electrode array) is affixed to the microcells, and the filled microcells are driven with electric fields to create a display.

For example, as described in U.S. Pat. No. 6,930,818, a male mold may be used to imprint a conductive substrate, upon which is formed a transparent conductor film. A layer of a thermoplastic or thermoset precursor is then coated on the conductor film. The thermoplastic or thermoset precursor layer is embossed at a temperature higher than the glass transition temperature of the thermoplastic or thermoset precursor layer by the male mold in the form of a roller, plate or belt. Once formed, the mold is released during or after the precursor layer is hardened to reveal an array of microcells. The hardening of the precursor layer may be accomplished by cooling, cross-linking by radiation, heat or moisture. If the curing of the thermoset precursor is accomplished by UV radiation, UV may radiate onto the transparent conductor film from the bottom or the top of the web as shown in FIGS. 2a and 2b of U.S. Pat. No. 6,930,818. Alternatively, UV lamps may be placed inside the mold. In this case, the mold must be transparent to allow the UV light to radiate through the pre-patterned male mold on to the thermoset precursor layer.

The thermoplastic or thermoset precursor for the preparation of the microcells may be multifunctional acrylate or methacrylate, vinylether, epoxide and their oligomers, polymers and the like. A crosslinkable oligomer imparting flexibility, such as urethane acrylate or polyester acrylate, is usually also added to improve the flexure resistance of the embossed micro-cups. The composition may contain polymer, oligomer, monomer and additives or only oligomer, monomer and additives.

In general, the microcells can be of any shape, and their sizes and shapes may vary. The microcells may be of substantially uniform size and shape in one system. However, in order to maximize the optical effect, microcells having a mixture of different shapes and sizes may be produced. For example, microcells filled with a dispersion of the red color may have a different shape or size from the green microcells or the blue microcells. Furthermore, a pixel may consist of different numbers of microcells of different colors. For example, a pixel may consist of a number of small green microcells, a number of large red microcells, and a number of small blue microcells. It is not necessary to have the same shape and number for the three colors.

The openings of the microcells may be round, square, rectangular, hexagonal, or any other shape. The partition area between the openings is preferably kept small in order to achieve a high color saturation and contrast while maintaining desirable mechanical properties. Consequently the honeycomb-shaped opening is preferred over, for example, the circular opening.

For reflective electrophoretic displays, the dimension of each individual microcell may be in the range of about $10^2$ to about $5 \times 10^5$ μm$^2$, preferably from about $10^3$ about $5 \times 10^4$ μm$^2$. The depth of the microcells is in the range of about 3 to about 100 microns, preferably from about 10 to about 50 microns. The opening to wall ratio is in the range of from about 0.05 to about 100, preferably from about 0.4 to about 20. The distances of the openings usually are in the range of from about 15 to about 450 microns, preferably from about 25 to about 300 microns from edge to edge of the openings.

Taken together, it will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

EXAMPLES

Examples are now given, though by way of illustration only, to show details of preferred electrophoretic media of the present invention.

To demonstrate the effect of polyisobutylene (PIB) on the color performance of a display, four dispersions, CS1, CS2, CS3, and CS4 (Comparative Examples), were prepared containing PIB at different concentrations.

The four samples of electrophoretic ink media contained 30% polymer coated titanium oxide particles, 7 wt % of red particles and 8% black particles, PIB, 0.2% Solsperse 19000 and other charge adjuvants in isoparaffin solvent. Table 1 provides the concentrations of PIB included in each sample.

The electrophoretic media was sealed between two transparent ITO-PET electrodes through a microcell filling-sealing technique to provide four display samples. The test samples were driven by a waveform generator using the same driving sequence. Measurement of the L*a*b* optical performance were conducted using an X-rite iOne spectrophotometer under a D65 illuminance setting.

TABLE 1

|  | CS1 | CS2 | CS3 | CS4 |
| --- | --- | --- | --- | --- |
| Polyisobutylene (wt. %) | 0.0% | 0.30% | 0.60% | 0.90% |
| Red L* | 33.9 | 31.9 | 31.0 | 33.5 |
| Red a* | 52.2 | 48.1 | 43.4 | 38.3 |

The Red a* (Ra) values exhibited by the display and provided in Table 1 were plotted in FIG. 1 demonstrating a decrease with increasing concentrations of PIB.

Three samples of electrophoretic media were prepared using the same method for preparing the Comparative Examples, except that a styrene-ethylene-propylene copolymer was added to the dispersions. The optical testing method was repeated and used to provide bistability results.

The bistability or image stability results provided in Table 2 were obtained by driving each sample to either a white, black or red state, disconnecting the sample from the power source, leaving the samples for 24 hours, and then measuring the optical state again. The difference between in the optical values before and after storage is the delta value in Table 2.

As demonstrated by Table 2, image stability of the color electrophoretic medium may be improved or maintained with increasing concentrations of polyisobutylene, and the color performance (Red a) exhibited substantial improvement despite increased loading of polyisobutylene when the copolymer was present in the dispersion.

TABLE 2

|  | CS3 | Sample1 | Sample2 | Sample3 |
| --- | --- | --- | --- | --- |
| Polyisobutylene (wt. %) | 0.60% | 0.20% | 0.40% | 0.60% |
| PS PE/PP copolymer (wt. %) | 0.00% | 0.60% | 0.40% | 0.20% |
| Black and white CR | 25 | 27 | 26 | 27 |
| Red L* | 31 | 32 | 32 | 32 |
| Red a | 43 | 47 | 47 | 49 |
| W-BST 24 hrs (ΔL*) | 0.5 | 0.9 | 0.8 | 0.5 |
| W-BST 24 hrs (Δa) | −0.2 | 0.0 | 0.0 | 0.3 |
| K-BST 24 hrs (ΔL*) | 0.0 | −0.3 | −0.4 | −0.2 |
| K-BST 24 hrs (Δa) | 0.0 | 0.0 | −0.2 | −0.2 |
| R-BST 24 hrs (ΔL*) | 0.7 | 0.3 | 0.3 | 0.5 |
| R-BST 24 hrs (Δa) | 0.2 | −0.4 | −0.1 | 0.0 |

By adding a combination of polyisobutylene and linear diblock copolymer based on styrene and ethylene/propylene, not only can the image stability be maintained and/or improved, but also the color state can achieve a better level. Thus, a combination of PIB and a co-polymer according to the various embodiments of the present invention provides additives that can be included in electrophoretic media to improve the performance of the media.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

We claim:

1. An electrophoretic medium comprises:
   (a) a non-polar fluid;
   (b) a plurality of first charged particles;
   (c) polyisobutylene; and
   a co-polymer comprising ethylene, propylene, and a vinyl aromatic.

2. The electrophoretic medium of claim 1, wherein the vinyl aromatic is selected from the group consisting of styrene, alpha-methyl styrene, 2-methyl styrene, 3-methyl styrene, 4-methyl styrene, 44-butyl styrene, 4-cyclohexyl styrene, 4-dodecyl styrene, 2,4-diisopropyl styrene, 2,4,6-trimethyl styrene, 2-ethyl-4-benzyl styrene, 4-(phenyl butyl) styrene, 1-vinyl naphthalene, 2-vinyl naphthalene, vinyl anthracene, 4-methoxy styrene, monochlorostyrene, dichlorostyrene, divinyl benzene, indene, methyl indene, and combinations thereof.

3. The electrophoretic medium of claim 1, wherein the vinyl aromatic comprises styrene.

4. The electrophoretic medium of claim 1, wherein the weight percent of the vinyl aromatic in the copolymer is 20% to 40%.

5. The electrophoretic medium of claim 1, wherein the weight ratio of polyisobutylene to co-polymer in the dispersion is 1:5 to 5:1.

6. The electrophoretic medium of claim 1, wherein the first charged particles are red, green, blue, cyan, yellow, or magenta.

7. The electrophoretic medium of claim 6 further comprising a plurality of second charged particles dispersed in the non-polar fluid.

8. The electrophoretic medium of claim 7, wherein the second charged particles are white or black.

9. The electrophoretic medium of claim 8, wherein the second charged particles are white and the first and second charged particles have opposite charge polarities.

10. The electrophoretic medium of claim 9, wherein the second charged particles comprise titania.

11. The electrophoretic medium of claim 9 further comprising a plurality of third charged particles dispersed in the non-polar fluid.

12. The electrophoretic medium of claim 11, wherein the third charged particles are black and the first and third charged particles have the same charge polarity.

13. The electrophoretic medium of claim 12, wherein the third charged particles comprise, carbon black or copper chromite.

14. The electrophoretic medium of claim 1, further comprising an ionic surfactant.

15. An electrophoretic medium comprising:
(a) a non-polar fluid;
(b) a plurality of first charged particles;
(c) polyisobutylene; and
(d) an additive selected from co-polymers of a vinyl aromatic and at least one substituted or unsubstituted hydrocarbon having 2 to 5 carbons and at least one double bond,
wherein the combined weight percent of polyisobutylene and additive is 0.1 to 2.5% based on the total weight of the dispersion.

16. The electrophoretic medium of claim 15, wherein the combined weight percent of polyisobutylene and additive is 0.5 to 1% based on the total weight of the dispersion.

17. The electrophoretic medium of claim 1, further comprising a plurality of second charged particles and a plurality of third charged particles dispersed in the non-polar fluid, wherein the first, second, or third charged particles are red, green, blue, cyan, yellow, magenta, white, or black.

18. The electrophoretic medium of claim 1, wherein the non-polar fluid comprises C6-C18 branched alkanes.

* * * * *